US006050929A

United States Patent [19]

Forrester

[11] Patent Number: 6,050,929
[45] Date of Patent: Apr. 18, 2000

[54] METHOD FOR STABILIZING HEAVY METAL BEARING WASTE IN A WASTE GENERATION STREAM

[76] Inventor: Keith Edward Forrester, P.O. Box 2008, Hampton, N.H. 03843-2008

[21] Appl. No.: 08/729,832

[22] Filed: Oct. 8, 1996

Related U.S. Application Data

[63] Continuation of application No. 08/132,926, Oct. 7, 1993, abandoned.

[51] Int. Cl.[7] .......... A62D 3/00; B09B 1/00

[52] U.S. Cl. .......... 588/256; 405/128; 588/249

[58] Field of Search .......... 405/128, 129; 588/249, 256, 257

[56] References Cited

U.S. PATENT DOCUMENTS

| | | | |
|---|---|---|---|
| 4,049,462 | 9/1977 | Cocozza | 106/85 |
| 4,113,504 | 9/1978 | Chen et al. | 106/97 |
| 4,124,405 | 11/1978 | Quiénot | 106/111 |
| 4,375,986 | 3/1983 | Pichat | 106/85 |
| 4,536,034 | 8/1985 | Otto, Jr. et al. | 299/5 |
| 4,610,722 | 9/1986 | Duyvesteyn et al. | 75/97 |
| 4,629,509 | 12/1986 | O'Hara et al. | 106/118 |
| 4,671,882 | 6/1987 | Douglas et al. | 210/720 |
| 4,737,356 | 4/1988 | O'Hara | 432/659 |
| 4,804,147 | 2/1989 | Hooper | 241/24 |
| 4,927,293 | 5/1990 | Campbell | 405/128 |
| 4,946,311 | 8/1990 | Rosar et al. | 405/129 |
| 4,948,516 | 8/1990 | Fisher et al. | 210/751 |
| 4,950,409 | 8/1990 | Stanforth | 210/751 |
| 4,975,115 | 12/1990 | Irons | 75/330 |
| 5,130,051 | 7/1992 | Falk | 252/315.5 |
| 5,162,600 | 11/1992 | Cody et al. | 588/236 |
| 5,193,936 | 3/1993 | Pal et al. | 405/128 |
| 5,196,620 | 3/1993 | Gustin et al. | 588/252 X |
| 5,202,033 | 4/1993 | Stanforth et al. | 588/256 X |
| 5,234,498 | 8/1993 | Graves | 588/256 X |
| 5,242,246 | 9/1993 | Manchak et al. | 405/128 |
| 5,245,114 | 9/1993 | Forrester | 588/236 |
| 5,252,003 | 10/1993 | McGahan | 405/128 |
| 5,284,636 | 2/1994 | Goff et al. | 588/256 X |
| 5,285,000 | 2/1994 | Schwitzgebel | 588/256 |
| 5,295,761 | 3/1994 | Heacock et al. | 405/128 |
| 5,302,287 | 4/1994 | Losack | 405/128 X |
| 5,304,706 | 4/1994 | Hooykaas | 405/128 X |
| 5,304,710 | 4/1994 | Kiegel et al. | 405/128 X |
| 5,324,433 | 6/1994 | Grant et al. | 405/128 X |
| 5,387,738 | 2/1995 | Beckham et al. | 405/128 X |
| 5,387,740 | 2/1995 | Sasae et al. | 405/128 X |
| 5,430,233 | 7/1995 | Forrester | 588/236 |
| 5,430,235 | 7/1995 | Hooykaas et al. | 405/128 X |
| 5,431,825 | 7/1995 | Diel | 210/719 |
| 5,512,702 | 4/1996 | Ryan et al. | 588/256 |
| 5,536,899 | 7/1996 | Forrester | 588/256 |
| 5,538,552 | 7/1996 | Osing et al. | 588/256 X |
| 5,545,805 | 8/1996 | Chesner | 588/256 |
| 5,569,155 | 10/1996 | Pal et al. | 588/256 |
| 5,582,573 | 12/1996 | Weszely | 588/257 |
| 5,591,116 | 1/1997 | Pierce | 588/256 |
| 5,637,355 | 6/1997 | Stanforth et al. | 427/341 |
| 5,667,696 | 9/1997 | Studer et al. | 210/702 |
| 5,722,928 | 3/1998 | Forrester et al. | 588/256 |
| 5,846,178 | 12/1998 | Forrester | 588/256 |
| 5,860,908 | 1/1999 | Forrester | 588/256 |

FOREIGN PATENT DOCUMENTS

| | | |
|---|---|---|
| 2 227 515 | 11/1994 | United Kingdom . |
| WO92/16262 | 10/1992 | WIPO . |

*Primary Examiner*—Dennis L. Taylor
*Attorney, Agent, or Firm*—Hamilton, Brook, Smith & Reynolds, P.C.

[57] ABSTRACT

Heavy metal bearing products during production, processing and/or handling, and/or in landfills, storage or retention areas are stabilized prior to the generation or management as a waste by applying heavy metal stabilizing agents into the product stream thus avoiding complex and costly processing and treatment of waste under hazardous waste regulations.

20 Claims, No Drawings

METHOD FOR STABILIZING HEAVY METAL BEARING WASTE IN A WASTE GENERATION STREAM

RELATED APPLICATION

This application is a continuation of application Ser. No. 08/132,926 filed on Oct. 7, 1993, now abandoned, which is incorporated herein by reference in its entirety.

FIELD OF THE INVENTION

The invention relates to the pre-waste production stabilization of heavy metal bearing hazardous and/or solid waste subject to direct aqueous analyses, solid phase acid leaching, distilled water extraction, the California Citric Acid Leaching test and other citric leaching tests and/or Toricity Characteristics Leaching Procedure, by use of water soluble stabilizing agents such as flocculants, coagulants and heavy metal precipitants including sulfides, carbonates and phosphates. The stabilizing agents, are added to the material production, development or process prior to the first generation of any waste material. This approach responds directly to the RCRA requirement that exempt treatment of hazardous wastes be in a totally-enclosed fashion, a well as allowing for stabilization of heavy metal bearing particles to occur in a pre-mixed and as-produced manner in order to assure consistent and accurate ability to pass the waste extraction method of interest.

The combination of pre-waste materials with treatment additives such as epoxy agents, precipitants, flocculating agents, and granular activated carbon particles provides for as-produced stabilization where the need for post-produced waste mixing, feed controls, collection as a waste, storage manifesting, and expensive and burdensome post waste treatment is obviated.

One specific use under evaluation and study by the inventor involves the seeding of black beauty and other sand blast grit materials with various forms of air entrainable particle precipitants and minerals which would provide for a integral mixed soluble phase of heavy metal precipitant within the post-sandblast waste generated that would be released under a leaching exposure of the waste after sandblasting of Pb, Cu, Zn, and other metals bearing in paints, such as for ship yards. The advantage of the pre-waste stabilizer additive here is that the collection of the heavy metal bearing waste will not be as necessary for environmental and/or TCLP waste handling reasons, and upon any such collection the grit and paint products will have been seeded thus requiring no RCRA permitting for hazardous waste treatment or handling.

Another specific use of pre-waste stabilization involves the injection of particulate water soluble precipitants, flocculants, coagulants and/or mineral salts directly into the processing lines of auto-shredders and wire-chopping systems such that the first generation point of fines, dust, wastes, fluff and/or plastics have been seeded with such stabilizing agents and thus the produced waste will pass TCLP criteria and thus be exempt from RCRA Part B permitting.

The general approach of the pre-waste stabilization technology described herein can be utilized in many waste generation systems such as incinerators producing ash materials, wastewater sludge production, drilling tailings production and storage tank sludge collection. The specific application of stabilization agents into the process prior to the generation of wastes would be designed and operated on a case-by-case basis.

DESCRIPTION OF RELATED TECHNOLOGY

Leaching of heavy metal bearing wastes and direct discharges of heavy metal bearing wastewaters has been of concern to environmental regulators and waste producers since the 1970's and the promulgation of the Resource Conservation and Recovery Act (RCRA) in 1979 and with various health officials. Under RCRA, solid wastes may be considered hazardous if the waste leaches excessive heavy metals under the Toxicity Characteristic Leaching Procedure (TCLP). In addition, there exist various states such as California, Minnesota and Vermont which require additional leaching tests on solid waste in order to classify the waste and direct the more heavy metal leaching wastes to hazardous waste landfills.

In order to avoid having solid waste s be required to be handled at more expensive hazardous waste landfills, various researchers and solid waste businesses have investigated and methods to control the leaching of heavy metals such as lead from the solid waste. The art has looked at the control of leaching by ex-situ methods involving portland cement, silicates, sulfates, phosphates and combinations thereof. See U.S. Pat. Nos. 4,629,509 (calcium sulfide); 4,726,710 (sodium sulfur oxide salt); which are incorporated by reference.

SUMMARY OF THE INVENTION

Existing heavy metal treatment processes are designed and operated in a post-waste production mode or remediation mode and thus ignore the advantages of stabilizing agents into the product stream prior to or during waste production.

It is an object of the invention to provide a method that effectively treats any heavy metal bearing wastes by the use of water soluble stabilizing agents such as dry alum, activated carbon and/or heavy metal precipitants (e.g. sulfides and phosphates) such that the stabilized waste will resist the leaching of copper, zinc, lead, cadmium and other heavy metals.

It is another object of the invention to provide a method of in-line stabilization which allows for hazardous and solid waste treatment without the need for the use of any post-waste production mixing device and for the treated waste to remain free flowing.

It is a further object of the invention to provide for the mix of treatment chemicals to be added directly to the material generated prior to a waste classification and thus avoid the need to treat the waste as a hazardous waste under RCRA and avoid the need for treatment permitting.

In accordance with these and other objects of the invention, which will become apparent from the description below, the process according to the invention comprises:

adding a stabilizing agent, for example, a flocculant, coagulant and/or precipitant, or mixture thereof, such as ferric chloride, alum, ferric sulfate, feldspar, clays, activated alumina, phosphates or wastes comprising these elements, in sufficient quantity such that the treatment chemicals are dispersed onto or into the pre-waste material such that the produced waste will pass the regulatory limits imposed under the acid leaching tests, similar aggressive or natural and distilled water leaching environments.

Providing for a sufficient pre-waste seeding of stabilizing agents assures passage of TCLP leaching criteria and/or other relevant leaching tests in order to characterize the waste as non-hazardous and/or to reduce the solubility of the heavy metal bearing waste to a point considered suitable by the appropriate local, state and/or federal leaching criteria.

DETAILED DESCRIPTION

One of the most costly environmental tasks facing industry in the 1990's will be the clean-up and treatment of heavy metal bearing wastes, both solid and hazardous, at old dump sites, storage areas and retention areas and at existing waste generation sites such as process facilities or incinerators throughout the world. Depending on the specific state and federal regulations, those wastes will be classified as either solid, special or hazardous. The management options for the waste producer vary greatly depending on the waste classification and the regulatory requirements associated with that classification. The most stringent waste classification is that of hazardous.

There exist various methods of stabilizing and solidifying heavy metal bearing hazardous wastes. The most common method, using portland cement for physical solidification, is common knowledge in the environmental engineering field. There exist several patented processes for hazardous waste treatment such as using carbonates, polysilicates, phosphates and versions of portland cement. These patented methods and the use of portland cement all recognize the need to control chemistry and provide for mixing of the waste and the treatment chemicals in order to control heavy metal solubility as tested by the TCLP Federal acetic acid leaching test by either precipitation of the heavy metal into a less soluble compound or the physical encapsulation of the waste and surface area reduction.

Wastes subject to regulation are usually tested via the USEPA TCLP extraction method. The TCLP extraction method is referred to by the USEPA SW-846 Manual on how to sample, prepare and analyze wastes for hazardousness determination as directed by the Resource Conservation and Recovery Act (RCRA). The TCLP test by definition assumes that the waste of concern is exposed to leachate from an uncovered trash landfill cell, thus the TCLP procedure calls for the extraction of the waste with a dilute acetic acid solution which simulates co-disposal with decaying solid waste.

In the method of invention, a stabilizing agent can be used to reduce the leachability of heavy metals, such as lead, copper, zinc, chromium and cadmium, from a heavy metal bearing waste by contacting the stabilizing agent with the product from which the waste is generated, or with the generated waste while in the waste generation stream.

Wastes stabilizable by this method include various types of waste materials from which heavy metals can leach when subject to natural leaching, runoff, distilled water extraction, sequential extraction, acetic acid, TCLP and/or citric acid leaching or extraction. Examples of such heavy metal leachable wastes, include, for instance, wire chop waste, auto shredder fluff, sludges from electroplating processes, sand blast waste, foundry sand, and ash residues, such as from electroplating processes, arc dust collectors, cupola metal furnaces and the combustion of medical waste, municipal solid waste, commercial waste, sewage sludge, sewage sludge drying bed waste and/or industrial waste.

In one embodiment, a stabilizing agent is contacted with the product prior to generating a waste from the product. For example, the stabilizing agent can be contacted with the product while the product is in a product storage pile and/or while the product is in a waste generation stream. Further, the stabilizing agent can be directed onto the product while in said stream and/or onto the waste generation equipment which transports the product and/or operates upon the product to form the heavy metal bearing waste. For example, to reduce heavy metal leachability from auto shredder wastes, such as fluff, a stabilizing agent is added prior to generation of the wastes, which are collected after baghouse and cyclone collectors, including adding the stabilizing agent to auto shredder units, to conveying units or to handling units.

In another embodiment, heavy metal leachability from wastes, which are generated by chopping insulated wires, such as wire or fluff mixed with PVC, or paper, which surrounded the wire, are reduced by adding a stabilizing agent to the waste generation stream. The stabilizing agent can be added to the wire prior to, or after, primary and/or secondary choppers, separating beds, pneumatic lines, cyclones or other handling or processing equipment.

In yet another embodiment, the leachability of waste, generated from sand blasting a surface painted with heavy metal bearing paint, is reduced by contacting a stabilizing agent with the paint particles as the paint particles are generated by the sand blasting. The stabilizing agent can be blended with the grit used for sand blasting prior to blasting the painted surface, or coated onto the painted surface prior to blasting with the grit.

The existing hazardous waste treatment processes for heavy metal bearing wastes fail to consider the use of pre-waste stabilizer seeding and fail to design a treatment with the expectation of using the TCLP extractor as a miniature Continuous Flow Stirred Tank Reactor (CFSTR) in which complex solubility, adsorption, substitution, exchange and precipitation can occur as well as macro-particle formations. The invention presented herein utilizes the TCLP, WET and/or distilled leaching (DI) extractor as a continuous stirred tank reactor similar to that used in the wastewater industry for formation of flocculants, coagulants and precipitant reactions. In addition, the invention presented herein utilizes the post-extraction filtration with 0.45 micron filters as the method of formed particle capture and removal similar to that conducted by rapid sand filtrators used within the wastewater and water treatment fields.

Existing heavy metal treatment processes are designed and operated relying upon a post-waste production treatment. This approach ignores the regulatory, process, handling and permitting advantages of combining stabilizing agents such as retaining matrixes, coagulants and precipitants with the material to be wasted prior to such waste activity.

The ratio and respective amount of the applied stabilizing agent, added to a given heavy metal bearing material will vary depending on the character of such heavy metal bearing material, the process in which the waste is produced, heavy metal content and treatment objectives. It is reasonable to assume that the optimization of highly thermodynamically stable minerals which control metals such as Pb will also vary from waste type, especially if the waste has intrinsic characteristics available forms of Cl, Al(III), sulfate and Fe.

The current methods incur an extensive cost in assuring waste-to-treatment additive mixing with heavy equipment, waste handling and excavation. The invention presented herein changes that basis, and stands on the principle that the waste pre-seeding will suffice for any and all form of mixing and that regulators will allow for such seeding such that produced rainfall or simulated rainfall would carry the treatment chemical to the areas which, by natural leaching pathways, demand the most epoxy, flocculant, coagulant and precipitant treatment. Thus, for stabilization of heavy metal within, a stabilizing agent is added to the top of the waste pile and is then dispersed into said pile by leaching. Alternately, a stabilizing agent can be tilled into the first several feet depth of the product in a product pile, thereby allowing a time release of the stabilizing agent into the product pile and leaching pathways. The leaching can be natural, such as leaching resulting from rainfall, and/or the leaching can be induced, such as by spraying or injecting water at the surface of the product pile or below the surface of the product pile. The present invention also utilizes the mixing time and environment provided within the extraction device, thus deleting the need for the treatment additives to be mixed within the field. The sampling population required under SW-846 in addition to the mixing within the extractor provide for ample inter-particle action and avoid the need for expensive bulk mixing used with cements and common precipitant treatments now used on full scale waste treatment and site remediation activities.

EXAMPLE 1

In this first example, a medium grit sand blast was mixed with agglomerated Diammonium Phosphate prior to sand blasting a Pb bearing paint. As shown in Table 1, the grit was initially subject to TCLP leaching without the pre-waste treatment and secondly with 4 percent by weight Diammonium Phosphate. The results show that the combination of grit blast black beauty material and dry agglomerated phosphate met the regulatory limits of 5.0 ppm soluble Pb under the TCLP acid leaching test. The extraction used a 1000 ml tumbler and extraction fluid of TCLP1 in accordance with the TCLP procedure. Pb was analyzed by ICP after filtration of a 100 ml aliquot through a 45 micron glass bead filter.

TABLE 1

Pb from Sand Blast Residues Subject to TCLP Leaching

| Untreated | 4% DIAMMONIUM PHOSPHATE |
|---|---|
| 47 ppm | <0.05 ppm |

EXAMPLE 2

In this example, a copper wire waste was mixed on-line with Triple Super Phosphate prior to separation of the wire from the housing through a chopping line and thus prior to any generation of waste. The addition of Triple Super Phosphate was controlled by a vibratory feeder with a slide gate to control the volumetric rate of Triple Super Phosphate to the sections of wire passing by on a vibratory conveyor. After the on-line mixture, the wire and additive were subject to high speed chopping and air separation of the plastic housings and paper off of the copper wire. At this point in the process, the wire is considered a product and thus exempt from TCLP testing. The removed plastic and paper is lead bearing, and unless treated as above, is considered a hazardous waste. The combination of the wire waste and the Triple Super Phosphate resulted in a waste which passed TCLP testing, and thus allowed to be managed as a solid waste or for reuse and recycling.

TABLE 2

Wire Chopping Wastes Subject to TCLP Leaching

| Untreated | 4% Triple Super Phosphate |
|---|---|
| 8 ppm Pb | <0.5 ppm Pb |

From the above examples, it is apparent that a large number of combinations of products and treatment additives could be mixed prior to the generation of the product waste in order that the waste as generated would contain the sufficient quantity and quality of heavy metal stabilizing additives such that the waste as tested by TCLP would pass regulatory limits and thus avoid the need for post-waste production stabilization. The exact combination of stabilizing additives for each waste would be determined from evaluating local waste products and/or chemical supplies and conducting a treatability study using such mixtures that produces the end objective of soluble heavy metal control within the produced waste material at the most cost efficient manner. The exact mix recipe and dosage would probably vary due to the waste stream as shown in the above examples, and will vary depending on the aggressiveness of the leaching test or objective for waste stabilization.

What is claimed is:

1. A method for stabilizing a heavy metal in a heavy metal containing material to reduce leaching of the heavy metal therefrom when said material is exposed to natural or induced leaching conditions, comprising:

contacting heavy metal containing material with a stabilizing agent that binds to the heavy metal to form a heavy metal complex when exposed to natural or induced leaching conditions; and processing the heavy metal containing material and stabilizing agent through waste stream equipment to produce processed waste in which the heavy metal is complexed to the stabilizing agent when exposed to natural or induced leaching conditions, wherein leaching of the heavy metal from the processed waste is reduced.

2. The method of claim 1, wherein the heavy metal is selected from the group consisting of copper, zinc, lead, cadmium and chromium.

3. The method of claim 1, further comprising selecting the stabilizing agent from the group consisting of flocculants, coagulants, precipitants, complexing agents, epoxy agents and adsorbents.

4. The method of claim 1, further comprising selecting the stabilizing agent from the group consisting of phosphates, carbonates, silicates and sulfides.

5. The method of claim 4, wherein the phosphate is triple super phosphate, diammonium phosphate, phosphate rock or crop production phosphate.

6. The method of claim 1, wherein the waste generation equipment is an auto-shredder or wire-chopping system.

7. The method of claim 1, further comprising performing the contacting step before and/or as the heavy metal containing material is processed through the waste stream equipment.

8. The method of claim 1, further comprising testing the leachability of the heavy metal from the processed waste by performing a test selected from the group consisting of Toxicity Characteristic Leaching Procedure, California citric acid leaching test and citric acid leaching test.

9. A method for stabilizing heavy metal contained in insulation wire waste to reduce leaching of the heavy metal therefrom when said insulation wire waste is exposed to natural or induced leaching conditions, comprising:

contacting insulation wire containing heavy metal with a stabilizing agent that binds to the heavy metal to form a heavy metal complex when exposed to natural or induced leaching conditions; and processing the insulation wire and stabilizing agent through a wire chopping system to produce chopped insulation wire waste in which the heavy metal is complexed to the stabilizing agent when exposed to natural or induced leaching conditions, wherein leaching of the heavy metal from the chopped insulation wire waste is reduced.

10. The method of claim 9, further comprising selecting the stabilizing agent from the group consisting of phosphates, carbonates, silicates and sulfides.

11. The method of claim 10, wherein the phosphate is triple super phosphate, diammonium phosphate, phosphate rock or crop production phosphate.

12. The method of claim 10, wherein the stabilizing agent is triple super phosphate.

13. The method of claim 9, further comprising performing the contacting step before and/or as the heavy metal containing material is processed through the wire chopping system.

14. The method of claim 9, further comprising testing the leachability of the heavy metal from the chopped insulation wire waste by performing a test selected from the group consisting of Toxicity Characteristic Leaching Procedure, California citric acid leaching test and citric acid leaching test.

15. A method for stabilizing a heavy metal in autoshredder waste to reduce leaching of the heavy metal therefrom when said waste is exposed to natural or induced leaching conditions, comprising:

contacting heavy metal containing material with a stabilizing agent that binds to the heavy metal into form a heavy metal complex when exposed to natural or induced leaching conditions; and;

processing the heavy metal containing material and stabilizing agent through autoshredding equipment to produce autoshredder waste containing heavy metal in which the heavy metal is stabilized therein when exposed to natural or induced leaching conditions, wherein leaching of the heavy metal is reduced.

16. The method of claim 15, further comprising selecting the stabilizing agent from the group consisting of phosphates, carbonates, silicates and sulfides.

17. The method of claim 16, wherein the phosphate is triple super phosphate, diammonium phosphate, phosphate rock or crop production phosphate.

18. The method of claim 15, wherein the stabilizing agent is triple super phosphate.

19. The method of claim 15, further comprising performing the contacting step before and/or as the heavy metal containing material is processed through the autoshredding equipment.

20. The method of claim 15, further comprising testing the leachability of the heavy metal from the authoshredder waste by performing a test selected from the group consisting of Toxicity Characteristic Leaching Procedure, California citric acid leaching test and citric acid leaching test.

* * * * *